(12) United States Patent
Sanae

(10) Patent No.: US 9,150,056 B2
(45) Date of Patent: Oct. 6, 2015

(54) PNEUMATIC TIRE

(71) Applicant: SUMITOMO RUBBER INDUSTRIES, LTD., Kobe-shi, Hyogo (JP)

(72) Inventor: Ryuhei Sanae, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 405 days.

(21) Appl. No.: 13/655,064

(22) Filed: Oct. 18, 2012

(65) Prior Publication Data

US 2013/0220499 A1   Aug. 29, 2013

(30) Foreign Application Priority Data

Feb. 23, 2012   (JP) .................................. 2012-037901

(51) Int. Cl.
| | |
|---|---|
| *B60C 11/03* | (2006.01) |
| *B60C 11/117* | (2006.01) |
| *B60C 11/04* | (2006.01) |
| *B60C 11/13* | (2006.01) |

(52) U.S. Cl.
CPC .............. *B60C 11/04* (2013.01); *B60C 11/0302* (2013.04); *B60C 11/032* (2013.04); *B60C 11/1307* (2013.04); *B60C 11/1323* (2013.04); *B60C 11/1369* (2013.04); *B60C 11/1392* (2013.04); *B60C 2011/0341* (2013.04); *B60C 2011/0358* (2013.04); *B60C 2011/0369* (2013.04); *B60C 2011/0372* (2013.04); *B60C 2011/0374* (2013.04); *B60C 2011/0381* (2013.04); *B60C 2011/0388* (2013.04)

(58) Field of Classification Search
CPC .............. B60C 11/032; B60C 11/0302; B60C 2011/0381; B60C 2011/0383

USPC ...................................................... 152/209.28
See application file for complete search history.

(56) References Cited

U.S. PATENT DOCUMENTS

| | | | | |
|---|---|---|---|---|
| 6,164,354 | A * | 12/2000 | Yamakage | 152/209.18 |
| 2009/0114323 | A1 * | 5/2009 | Yamane | 152/209.18 |
| 2010/0139826 | A1 * | 6/2010 | Matsumoto | 152/209.18 |

FOREIGN PATENT DOCUMENTS

JP      2009-101785 A      5/2009

OTHER PUBLICATIONS

English machine translation of JP2009-101785, dated May 2009.*
Extended European Search Report dated May 31, 2013, for European Application No. 12189380.4.

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A pneumatic tire has: a circumferential groove on each side of the tire equator; oblique grooves extending from the circumferential groove while inclining to one circumferential direction; and lug grooves extending axially outwardly beyond the tread edges from positions axially outside the circumferential groove while inclining to the one circumferential direction. The lug grooves include: a first lug groove comprising an axially inner steeply-inclined part and an axially outer mildly-inclined part; and a second lug groove extending along the mildly-inclined part. The axially inner end of the first lug groove is at a distance La of 8 to 12% of the tread width from the circumferential groove. The steeply-inclined part inclines at an angle larger than an inclination angle of the oblique grooves.

8 Claims, 5 Drawing Sheets

PNEUMATIC TIRE

BACKGROUND OF THE INVENTION

The present invention relates to a pneumatic tire, more particularly to a tread pattern capable of improving high-speed running performance, especially steering stability during running in a racing circuit, as well as wet performance.

Japanese Patent Application Publication No. 2009-101785 discloses a pneumatic tire having a tread pattern shown in FIG. 5, wherein a circumferential groove (a) is disposed on each side of the tire equator Co, and main oblique grooves (b) and auxiliary oblique grooves (c) are disposed axially outside the circumferential groove (a) and arranged alternately in the tire circumferential direction. The main oblique groove (b) and auxiliary oblique groove (c) each have an axially outer end positioned axially outside the tread edge E1.

The axially inner end of the auxiliary oblique groove (c) is located far from the circumferential groove (a), but the axially inner end of the main oblique groove (b) is located very close to the circumferential groove (a).

As a result, the land portion (d) between the circumferential groove (a) and tread edge E1 is considered as being circumferentially divided into blocks (f) in practice.

Since the axially inner part (b1) of the main oblique groove (b) is steeply inclined with respect to the axial direction, the block (f) has a narrow-angled part (fe) between the circumferential groove (a) and the steeply-inclined inner part (b1).

Therefore, it is difficult to increase the rigidity of the land portion (d) to a sufficiently high level to further improve the dry grip performance.

Thus, there is room for improvement in high-speed running performance, especially steering stability during running in a circuit.

As to the wet performance, on the other hand, since the axially inner end of the main oblique groove (b) is not opened to the circumferential groove (a), there is room for improvement in the drainage.

SUMMARY OF THE INVENTION

It is therefore, an object of the present invention to provide a pneumatic tire, in which high-speed running performance, especially steering stability during running in a circuit, as well as wet performance can be improved.

According to the present invention, a pneumatic tire comprises a tread portion provided with a pair of circumferential grooves disposed one on each side of the tire equator, a plurality of oblique grooves extending axially outwardly from the circumferential grooves while inclining to one circumferential direction, and terminating without reaching to the tread edges, and a plurality of lug grooves extending axially outwardly beyond the tread edges from positions axially outside the circumferential grooves while inclining to one circumferential direction same as the oblique grooves, wherein the lug grooves include first lug grooves each comprising an axially inner steeply-inclined part and an axially outer mildly-inclined part to have a bent groove configuration, and second lug grooves each extending along the mildly-inclined part, the first lug groove has its axially inner end at an axial distance La of from 8 to 12% of the tread width from the circumferential groove, the steeply-inclined part extends axially outwardly from the above-mentioned axially inner end while inclining at an angle larger than the inclination angle of the oblique grooves, and between every two of the circumferentially adjacent oblique grooves, one first lug groove and one second lug groove are disposed.

Further, the pneumatic tire may be provided with the following optional features:

the above-mentioned one circumferential direction is opposite to an intended tire rotational direction indicated on the outer surface of the tire, and the first lug groove has a heel-side groove-sidewall and a toe-side groove-sidewall in the intended tire rotational direction wherein the angle of the heel-side groove-sidewall with respect to the normal direction to the tread surface is larger in the axially inner steeply-inclined part than in the axially outer mildly-inclined part;

the oblique grooves each have a width gradually decreasing toward the axially outside, and the width at the axially inner end is not less than 8 mm;

between each of the second lug grooves and the adjacent circumferential groove, an auxiliary groove is disposed to extend along an extended line of the second lug groove; and the axial distance Lb between the auxiliary groove and the circumferential groove is not more than the distance La and not less than 4% of the tread width.

Incidentally, the terms "heel-side" and "toe-side" mean "rear-side" and "front-side", respectively, when considered in the ground contacting patch of the tire in relation to the traveling direction of the tire rotated in the intended tire rotational direction.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure is uniformly defined by 180 kPa.

The tread edges are the axial outermost edges of the ground contacting patch (camber angle=0) in the normally inflated loaded condition.

The tread width is the axial distance between the tread edges measured in the normally inflated unloaded condition of the tire.

DESCRIPTION OF THE PREFERRED EMBODIMENTS

Embodiments of the present invention will now be described in detail in conjunction with the accompanying drawings.

The pneumatic tire 1 according to the present invention comprises a tread portion 2, a pair of axially spaced bead portions, a pair of sidewall portions extending between the tread edges and the bead portions, a carcass extending between the bead portions, and a tread reinforcing belt disposed radially outside the carcass in the tread portion as usual.

In the present invention, the category of the tire and the inside structure of the tire are not particularly limited. But, the invention is suitably applied to a high-speed radial tire for four wheel cars.

Figure 1:
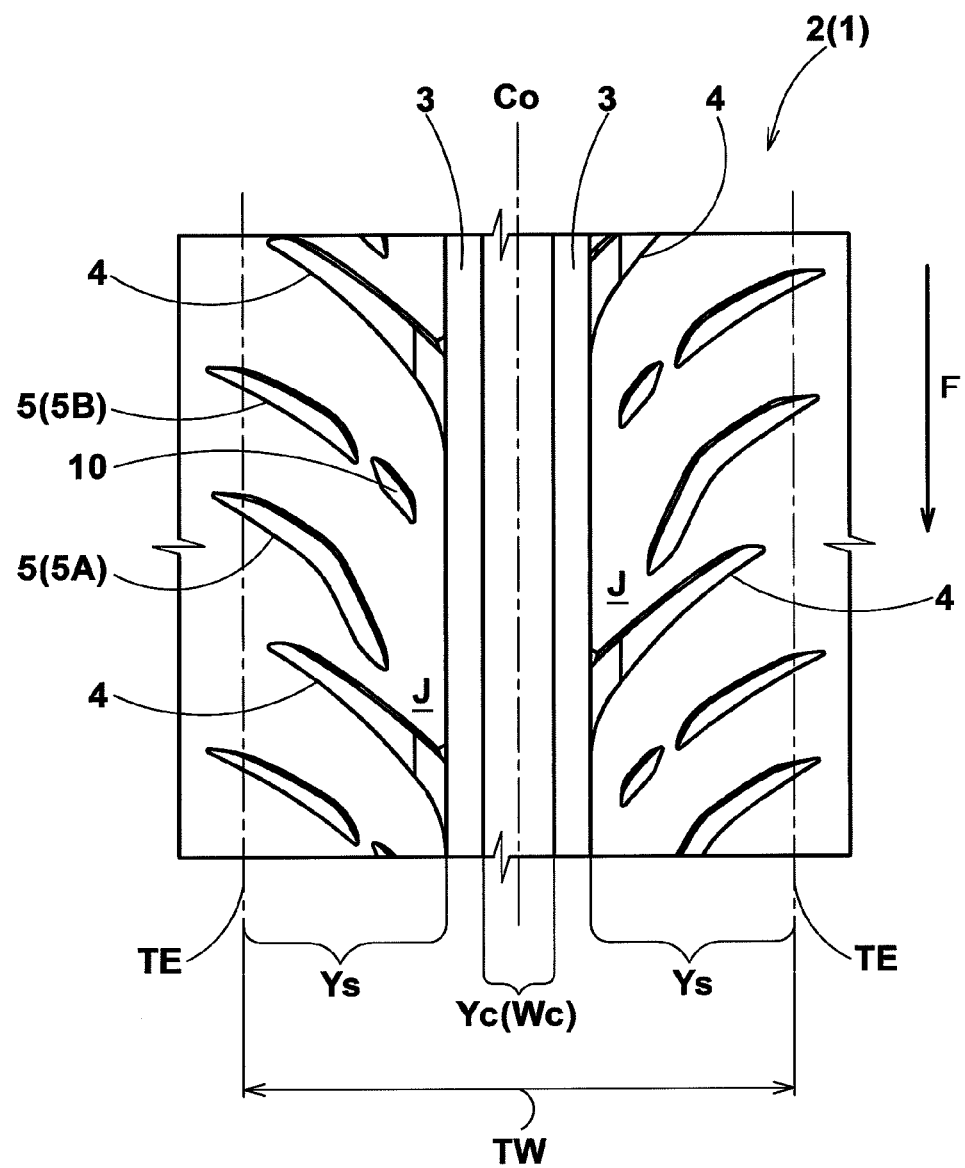
FIG. 1 is a developed partial plan view of a pneumatic tire as an embodiment of the present invention showing a tread pattern.

In the drawings, pneumatic tire 1 as an embodiment of the present invention is a radial tire for four wheel racing cars, and the tire is provided in the tread portion 2 with a unidirectional tread pattern having a designed intended tire rotational direction F as shown in FIG. 1. Incidentally, the intended tire rotational direction F is indicated in the sidewall portions of the tire by the use of for example an arrowed line or the like.

In order to define the tread pattern, the tread portion 2 is provided with:
a pair of circumferential grooves 3 extending continuously in the tire circumferential direction and disposed one on each side of the tire equator Co;
a plurality of oblique grooves 4 extending axially outwardly from the circumferential grooves 3; and
a plurality of lug grooves 5 disposed axially outside the circumferential grooves 3 inbetween the oblique grooves 4.
The tread pattern is symmetrical about the tire equator Co except that one tread half is circumferentially shifted from the other tread half.

The circumferential grooves 3 may be a gentle zigzag groove (inclusive of linear zigzag and wavy or smoothly curved zigzag). In this embodiment however, in order to maximize the drainage in the tread center zone, the circumferential grooves 3 are each formed as a straight groove of which edges are parallel to the tire circumferential direction.

The circumferential grooves 3 are symmetrically arranged about the tire equator Co in order to balance the drainage between the right-hand side and left-hand side of the tire equator Co.

In this embodiment, except for the above-mentioned two circumferential grooves 3, there is no groove extending continuously in the tire circumferential direction for purpose of drainage in order to secure a high tread pattern rigidity.

According to the present invention, the width W3 and depth D3 of the circumferential groove 3 are not particularly limited. But, in the case of the passenger car tire sizes, it is preferable that the groove width W3 is set in a range of from 4 to 8% of the tread width TW, and the groove depth D3 is set in a range of from 5 to 10 mm.

If the land portion Yc defined between the two circumferential grooves 3 is too narrow in the axial width, there is a tendency that straight running performance is deteriorated. If the land portion Yc is too wide, the land portions Ys between the circumferential grooves 3 and the tread edges TE become narrow in the axial width and decrease in the lateral stiffness (rigidity), therefore, it is disadvantageous for the steering stability.

In this light, the axial width we of the land portion Yc is preferably set in a range of from 10 to 15% of the tread width TW.

All of the oblique grooves 4 extend axially outwardly from the circumferential grooves 3 toward the tread edges TE, while inclining to one circumferential direction which is opposite to the intended tire rotational direction F.

Each of the oblique grooves 4 has an axially inner end 4i opened to the circumferential groove 3 and an axially outer end 4o closed on the axially inside of the tread edge TE. The oblique groove 4 is inclined at a relatively large angle θ4 with respect to the tire circumferential direction. Preferably, the angle θ4 is set in a range of from 40 to 60 degrees. Thus the oblique groove 4 is mildly inclined with respect to the tire axial direction.

If the angle θ4 is less than 40 degrees, there is a tendency that the rigidity becomes insufficient in a part 3 between the oblique groove 4 and circumferential groove 3. The angle θ4 more than 60 degrees is disadvantageous to the drainage.

The angle θ4 may be constant through the entire groove length. In this embodiment, however, the angle θ4 is gradually increased toward the axially outside.

The width W4 of the oblique groove 4 is gradually decreased toward the axially outside in view of the rigidity, and the maximum width W4i at the axially inner end 4i is set to be 8 mm or more for the drainage.

Figure 3:
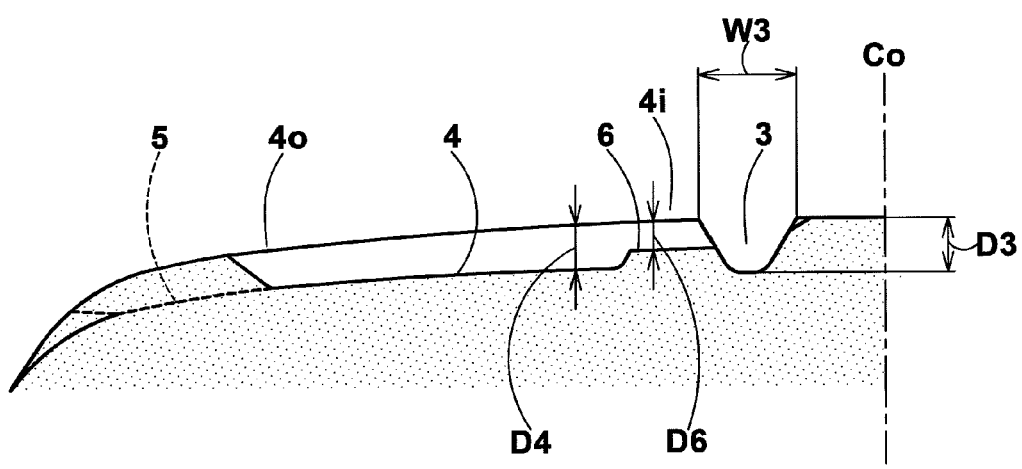
FIG. 3 is a cross sectional view of an oblique groove taken along the groove center line.

In order to prevent a rigidity decrease due to the widened axially inner end 4i, a shallow part 6 is formed in an axially inner end part of the oblique groove 4 as shown in FIG. 3.

In the shallow part 6, the groove depth D6 of the oblique groove 4 is preferably set in a range of from 35 to 65% of the maximum groove depth D4 of the oblique groove 4 occurring in the resultant deeper part other than the shallow part 6.

The maximum groove depth D4 is preferably in a range of from 80 to 100% of the depth D3 of the circumferential grooves 3.

The distance L4 from the tread edge TE to the axially outer end 4o of the oblique groove 4 is preferably set in a range of from 4 to 10% of the tread width TW.

The lug grooves 5 extend axially outwardly beyond the tread edges TE from their axially inner closed ends, while inclining to the above-mentioned one circumferential direction opposite to the intended tire rotational direction F.

The axially inner closed ends of the lug grooves 5 are positioned axially outside the circumferential grooves 3. The lug grooves 5 in this embodiment are first lug grooves 5A and second lug grooves 5B.

On the axially outside of each of the circumferential grooves 3, the first lug grooves 5A and second lug grooves 5B are arranged alternately in the tire circumferential direction, and one of the first lug grooves 5A and one of the second lug grooves 5B are disposed between every two of the circumferentially adjacent oblique grooves 4.

The first lug groove 5A is a bent groove made up of a steeply-inclined part 7 extending from the axially inner end 5Ai of the lug groove 5A to be steeper than the oblique groove 4, and a mildly-inclined part 8 extending from the steeply-inclined part 7 to incline mildly than the steeply-inclined part 7. According to the present invention, it is not essential but preferable that the angle θ7 of the steeply-inclined part 7 with respect to the circumferential direction is set in a range of from 20 to 30 degrees, the angle θ8 of the mildly-inclined part 8 with respect to the circumferential direction is set in a range of from 40 to 60 degrees, and the difference (θ8−θ7) therebetween is in a range of from 10 to 40 degrees.

The steeply-inclined part 7 and the mildly-inclined part 8 are smoothly connected with each other through a connecting part 9 curved in a substantially arc shape.

The second lug groove 5B is formed as a mildly-inclined groove extending in substantially parallel with the mildly-inclined part 8 so that the difference between the angle θp of the mildly-inclined part 8 at any axial position P thereof and the angle θp of the second lug groove 5B at the same axial position P is not more than 10 degrees.

According to the present invention, it is not essential but preferable that, at the above-mentioned axial position P, the second lug groove 5B has the substantially same width and substantially same depth as the mildly-inclined part 8 so that the width of the second lug groove 5B is in a range of from 90 to 110% of the width of the mildly-inclined part 8, and the depth of the second lug groove 5B is in a range of from 90 to 110% of the depth of the mildly-inclined part 8.

The axial distance La from the circumferential groove 3 to the axially inner closed end 5Ai of the first lug groove 5A is set in a range of from 8 to 12% of the tread width TW.

The axial distance Lc from the circumferential groove 3 to the axially inner end closed 5Bi of the second lug groove 5B is set to be not less than the axial distance La (in this embodiment, Lc>La).

In this embodiment, between each of the second lug grooves 5B and the circumferential groove 3, an auxiliary groove 10 is formed so as to extend along an extended line of the second lug groove 5B.

Preferably, the axial distance Lb between the axially inner end 10i of the auxiliary groove 10 and the circumferential groove 3 is set to be not more than the axial distance La and not less than 4% of the tread width TW in order that the rigidity distribution of the land portion Ys is optimized while maintaining the rigidity at high levels, and thereby the controllability is improved.

Therefore, in the tread pattern in this embodiment, there is no groove extending across the entire width of each of the land portions Ys between the circumferential grooves 3 and the tread edges TE. As a result, the land portions Ys extends continuously in the circumferential direction in a zigzag manner. Thus, the land portion vs maintains high rigidity in comparison with a land portion circumferentially divided into blocks. Since the oblique grooves 4 are connected to the circumferential grooves 3, good drainage can be obtained. As a result, it is possible to form the oblique grooves 4 with mild inclination, and the part 3 between the circumferential groove 3 and oblique groove 4 is prevented from becoming narrow and the rigidity of the land portion Ys can be prevented from locally decreasing.

The first lug groove 5A can increase drainage because the steeply-inclined part 7 is formed in the axially inside. Further, since the axially inner end 5Ai is spaced apart from the circumferential groove 3 by the distance La, a decrease in the rigidity due to the steeply-inclined part 7 can be prevented. Furthermore, since the first lug groove 5A has the mildly-inclined part 8 whose axially outer end is outside the tread edge TE and the second lug groove 5B is mildly-inclined, the rigidity in the tread shoulder region especially lateral stiffness (rigidity) can be maintained at high levels, and it is possible to increase the cornering force.

Owing to cooperation of those effects, it becomes possible to improve high-speed running performance, especially steering stability during running in a circuit, while maintaining the wet performance at a high level.

If the axial distance La of the axially inner end 5Ai of the first lug groove 5A from the circumferential groove 3 is less than 8% of the tread width TW, the rigidity of the land portion Ys becomes insufficient. If more than 12% of the tread width TW, the drainage is liable to deteriorate.

If the axial distance Lc of the axially inner end 5Bi of the second lug groove 5B from the circumferential groove 3 is less than the distance La, or if the axial distance Lb of the axially inner end 10i of the auxiliary groove 10 from the circumferential groove 3 is less than 4% of the tread width TW, or if the axial distance Lb is more than the axial distance La, then the rigidity balance in the land portion Ys becomes worse and the controllability during running in a circuit is deteriorated.

If the axial distance L4 of the axially outer end 4o of the oblique groove 4 from the tread edge TE is less than 4% of the tread width TW, there is a tendency that the rigidity of the land portion Ys becomes insufficient. If more than 10%, there is a tendency that the drainage becomes insufficient.

If the second lug groove 5B is not parallel with the mildly-inclined part 8 of the first lug groove 5A, a relatively narrow width part is formed therebetween, and there is a possibility that this part becomes a weak point.

Figure 4A:
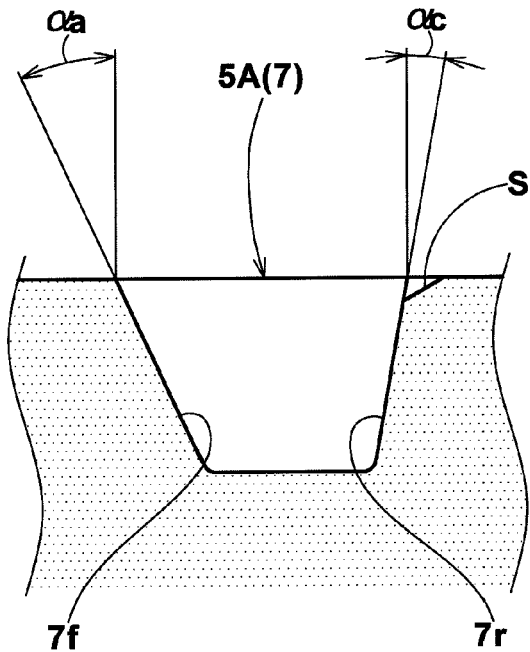
FIG. 4(a) is a cross sectional view taken along line A-A in FIG. 2.
Figure 4B:
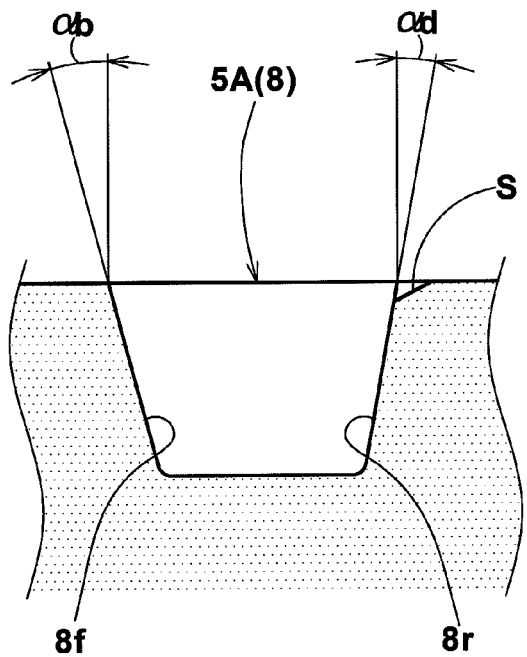
FIG. 4(b) is a cross sectional view taken along line B-B in FIG. 2.
Figure 5:
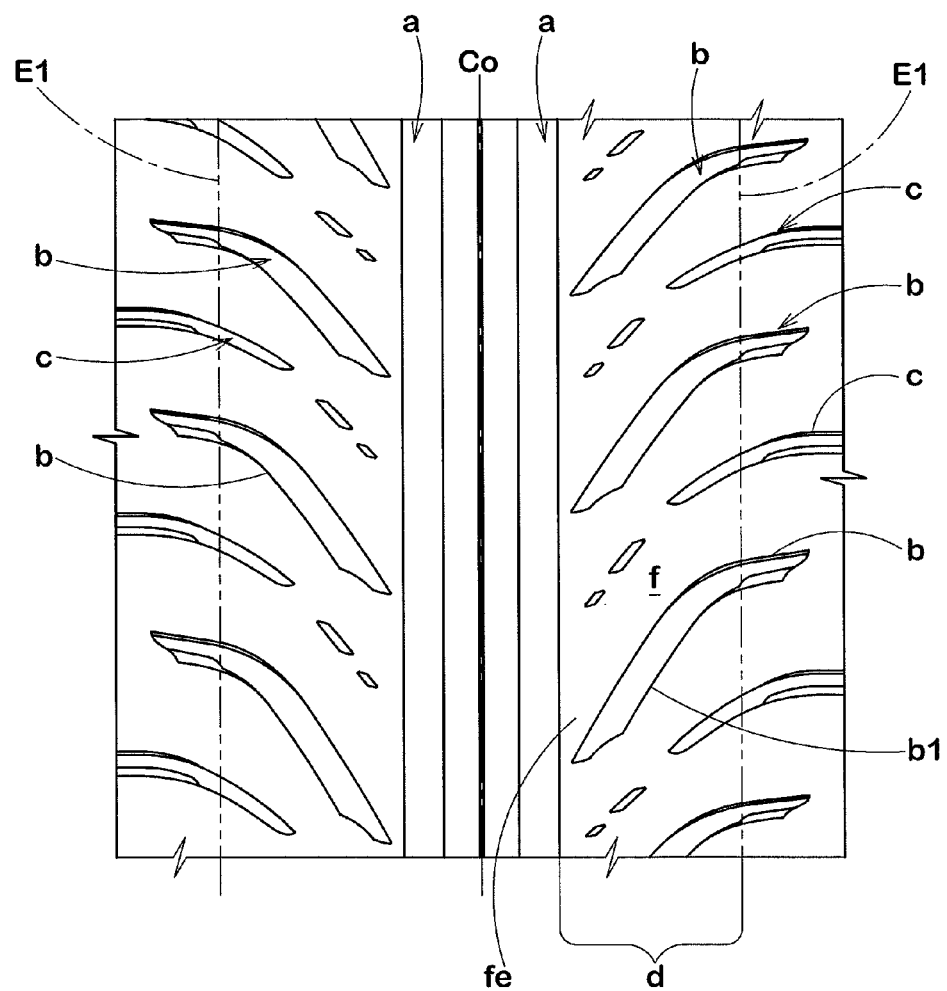
FIG. 5 is a developed partial view of a conventional tread pattern.

In order to satisfy both of the drainage and wear performance during running in a circuit, as shown in FIGS. 4(a) and 4(b), in the first lug groove 5A, the angle αa of the heel-side groove-sidewall 7f of the steeply-inclined part 7 with respect to a normal line to the tread face is set to be more than the angle αb of the heel-side groove-sidewall 8f of the mildly-inclined part 8 with respect to a normal line to the tread face, wherein each angle αa, αb is measured in a cross section of the groove perpendicular to the longitudinal direction of the groove.

Preferably, the angle difference (αa−αb) is set in a range of from 10 to 20 degrees, and the angle αa is set in a range of from 20 to 30 degrees.

Figure 2:
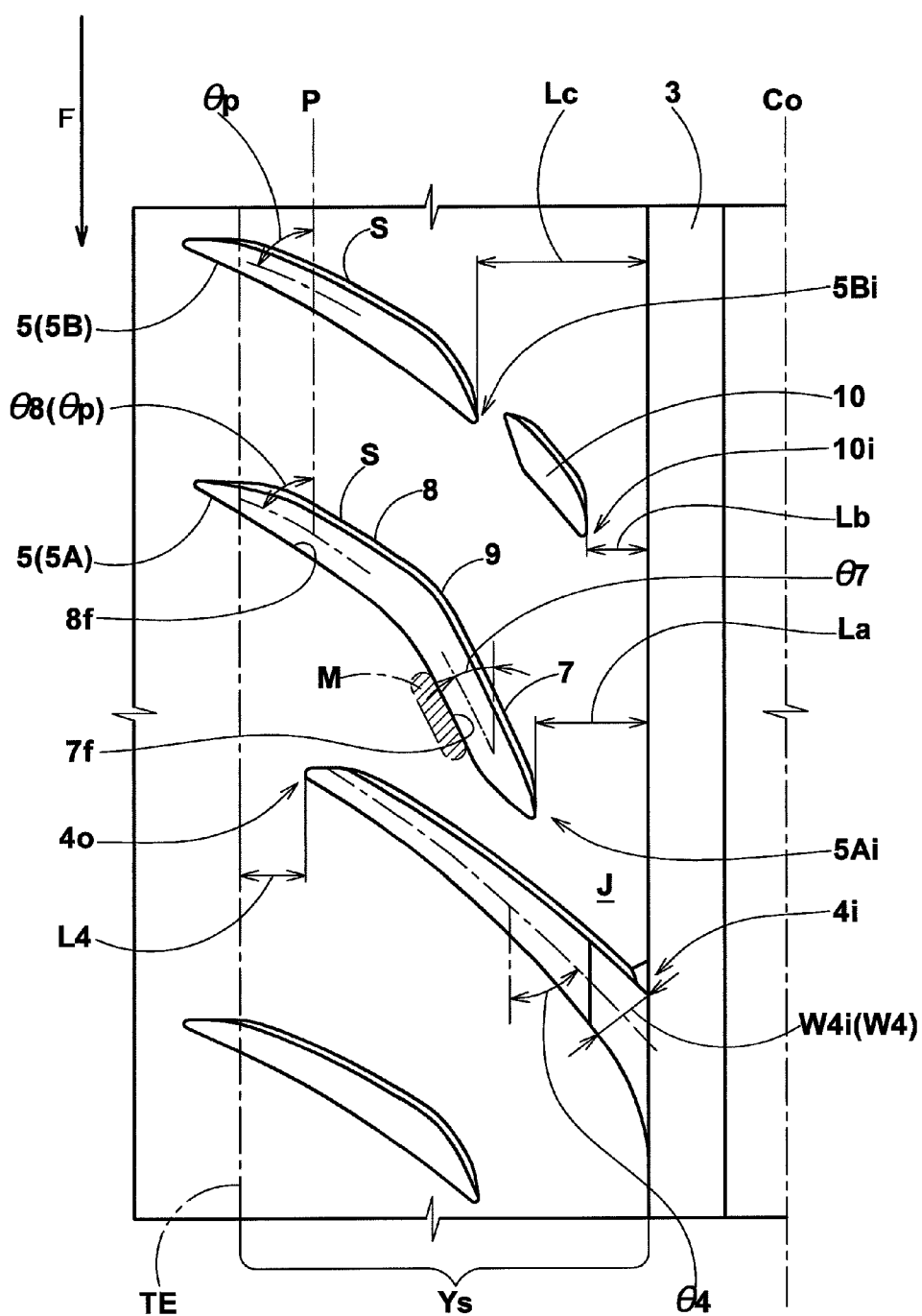
FIG. 2 is a closeup of a left part of FIG. 1.

By setting the angle αa at a relatively large value in this way, a decrease in the lateral stiffness (rigidity) due to the steeply-inclined part 7 can be controlled, and uneven wear can be prevented in a region M along the groove-sidewall 7f shown in FIG. 2. This can prevent the controllability from deteriorating due to uneven wear occurring during continuous high-speed running.

In this embodiment, further, the angle αc of the toe-side groove-sidewall 7r of the steeply-inclined part 7 with respect to a normal line to the tread face and the angle αd of the toe-side groove-sidewall 8r of the mildly-inclined part 8 with respect to a normal line to the tread face are set to be less than the angle αb, for example 10 degrees, in order to secure necessary groove volume for the drainage performance.

The first lug groove 5A is provided with a chamfer S along the corner between the toe-side groove-sidewall (7r, 8r) and the tread surface in order to control uneven wear.

Further, in this embodiment, each of the second lug grooves 5B and the auxiliary grooves 10 is also provided with a chamfer S along the corner between its toe-side groove-sidewall and the tread surface. Furthermore, the angles of the heel-side and toe-side groove-sidewalls of each groove are set in the same way (and in the same ranges) as the mildly-inclined part 8 of the first lug groove 5A.

Comparison Tests

Radial tires of size 245/40R18 (rim size 18×8JJ) having tread patterns based on the tread pattern shown in FIG. 1 and having specifications shown in Table 1 were prepared and tested for drainage and high-speed running performance (steering stability). All of the tires had same specifications except for those shown in Table 1.
Common specifications are as follows:
tread width TW: 212 mm
<Circumferential Groove>
    width W3: 13.0 mm
    depth D3: 7.5 mm
<Land Portion Yc>
    width Wc: 26.0 mm
<Oblique Groove>
    angle θ4: 60 deg.(max) to 45 deg.(min),
        gradually increasing toward tread edge
    width W4: 12.5 mm(max),
        gradually decreasing toward tread edge
    depth D4: 6.5 mm(max) to 4.5 mm(min),
        gradually decreasing toward tread edge
    depth D6 at shallow part: D4×0.53
<First Lug Groove>
    axially outer end position: outside tread edge
    width: 8.9 mm(max)
    depth: 6.5 mm(max) to 4.5 mm(min),
        gradually decreasing toward tread edge
<Second Lug Groove>
    axially outer end position: outside tread edge
    axially inner end position Lc: 15% of TW
    width and depth: substantially same as first lug groove
<Auxiliary Groove>
    width and depth: substantially same as second lug groove
<Drainage Test>

In the test, a test car (Japanese-made 3000 cc FR passenger car) provided on all of the four wheels with test tires (tire pressure 230 kPa) was run along a 100 meter radius circle on an asphalt road partially provided with a 10 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in Table 1 by an index based on Comparative example tire Ref.1 being 100, wherein the larger is better.

<High Speed Running Performance Test>

The above-mentioned test car was run in a circuit under a dry condition, and the test driver evaluated high-speed steering stability based on the controllability, grip performance, steering response, and lowering of the controllability with the increase in the running distance. The results are indicated in Table 1 by an index based on Comparative example tire Ref.1 being 100, wherein the larger the value, the better the performance.

As apparent from Table 1, according to the present invention, the high speed running performance can be improved without sacrificing the wet performance.

TABLE 1

(1/2)

| Tire | Ref. 1 | Ex. 1 | Ex. 2 | Ex. 3 | Ex. 4 | Ref. 2 | Ex. 5 | Ex. 6 | Ref. 3 | Ref. 4 | Ref. 5 |
|---|---|---|---|---|---|---|---|---|---|---|---|
| <Oblique groove> | | | | | | | | | | | |
| inner end position *1 (L4/TW (%)) | 0 outside tread edge | 0 6 | 0 4 | 0 10 | 0 12 | 0 6 | 0 6 | 0 6 | 0 6 | 0 6 | 0 6 |
| width W4i (mm) at axially inner end | 12.5 | 12.5 | 12.5 | 12.5 | 12.5 | 12.5 | 12.5 | 12.5 | 12.5 | 12.5 | 12.5 |
| <First lug groove> | | | | | | | | | | | |
| inner end position (La/TW (%)) | 10 | 10 | 10 | 10 | 10 | 6 | 8 | 12 | 14 | 10 | 10 |
| steeply-inclined part angle θ7 (deg.) | 26 | 26 | 26 | 26 | 26 | 26 | 26 | 26 | 26 | none — | 26 |
| mildly-inclined part angle θ8 (deg.) | 55 | 55 | 55 | 55 | 55 | 55 | 55 | 55 | 55 | 55 | |
| heel-side groove-sidewalls angle αa (deg.) | 25 | 25 | 25 | 25 | 25 | 25 | 25 | 25 | 25 | — | |
| angle αb (deg.) | 15 | 15 | 15 | 15 | 15 | 15 | 15 | 15 | 15 | 15 | |
| <Second lug groove> | | | | | | | | | | | |
| substantially parallel with -- | mildly-inclined part | ditto | ditto | ditto | ditto | ditto | ditto | ditto | ditto | ditto | steeply-inclined part |
| <Auxiliary groove> | | | | | | | | | | | |
| inner end position (Lb/TW (%)) | 5.5 | 5.5 | 5.5 | 5.5 | 5.5 | 5.5 | 5.5 | 5.5 | 5.5 | 5.5 | 5.5 |
| Drainage | 100 | 95 | 98 | 92 | 90 | 98 | 97 | 90 | 85 | 85 | 97 |
| High-speed running performance | 100 | 150 | 140 | 155 | 160 | 130 | 140 | 150 | 155 | 150 | 120 |

TABLE 1-continued (2/2)

| Tire | Ex. 7 | Ex. 8 | Ex. 9 | Ex. 10 | Ref. 6 | Ex. 11 | Ex. 12 | Ex. 13 | Ref. 7 |
|---|---|---|---|---|---|---|---|---|---|
| <Oblique groove> | | | | | | | | | |
| inner end position *1 | 0 | 0 | 0 | 0 | 0 | 0 | 0 | 0 | 2% |
| outer end position (L4/TW (%)) | 6 | 6 | 6 | 6 | 6 | 6 | 6 | 6 | 6 |
| width W4i (mm) at axially inner end | 6 | 8 | 12.5 | 12.5 | 12.5 | 12.5 | 12.5 | 12.5 | 12.5 |
| <First lug groove> | | | | | | | | | |
| inner end position (La/TW (%)) | 10 | 10 | 10 | 10 | 10 | 10 | 10 | 10 | 10 |
| steeply-inclined part | | | | | | | | | |
| angle θ7 (deg.) | 26 | 26 | 26 | 26 | 26 | 26 | 26 | 26 | 26 |
| mildly-inclined part | | | | | | | | | |
| angle θ8 (deg.) | 55 | 55 | 55 | 55 | 55 | 55 | 55 | 55 | 55 |
| heel-side groove-sidewalls | | | | | | | | | |
| angle αa (deg.) | 25 | 25 | 25 | 15 | 25 | 25 | 25 | 25 | 25 |
| angle αb (deg.) | 15 | 15 | 25 | 15 | 15 | 15 | 15 | 15 | 15 |
| <Second lug groove> | | | | | none | | | | |
| substantially parallel with -- | mildly-inclined part | ditto | ditto | ditto | — | mildly-inclined part | ditto | ditto | ditto |
| <Auxiliary groove> | | | | | | | | none | |
| inner end position (Lb/TW (%)) | 5.5 | 5.5 | 5.5 | 5.5 | 5.5 | 4 | 10 | — | 5.5 |
| Drainage | 90 | 92 | 92 | 96 | 80 | 95 | 95 | 95 | 85 |
| High-speed running performance | 150 | 150 | 150 | 135 | 160 | 140 | 140 | 135 | 155 |

*1 axial distance from circumferential groove in percentage of tread width TW 0: axial distance = 0 and axially inner end is opened to circumferential groove

REFERENCE SIGNS LIST 1 pneumatic tire
2 tread portion
3 circumferential groove
4 oblique groove
4i axially inner end of oblique groove
4o axially outer end of oblique groove
5 lug groove
5A first lug groove
5Ai axially inner end of first lug groove
5B second lug groove
7 steeply-inclined part of second lug groove
7f heel-side groove-sidewall of steeply-inclined part
8 mildly-inclined part of second lug groove
8f heel-side groove-sidewall of mildly-inclined part
10 auxiliary groove
10i axially inner end of auxiliary groove
Co tire equator
TE tread edge

The invention claimed is:

1. A pneumatic tire comprising a tread portion having tread edges and a tread width therebetween and provided with
a pair of straight circumferential grooves disposed one on each side of the tire equator,
a plurality of oblique grooves extending axially outwardly from the circumferential grooves while inclining to one circumferential direction and terminating without reaching to the tread edges, wherein
a width of each of the oblique grooves is gradually decreased from its axially inner end connected to one of the circumferential grooves to its axially outer terminal end, and
an inclination angle θ4 of each of the oblique grooves with resect to the tire circumferential direction is gradually increased from its axially inner end to its axially outer terminal end, and
a plurality of lug grooves extending axially outwardly beyond the tread edges from positions axially outside the circumferential grooves while inclining to one circumferential direction same as the oblique grooves, wherein
the lug grooves include
first lug grooves each composed of an axially inner steeply-inclined part and an axially outer mildly-inclined part which are connected to each other through an arc-shaped part to have a bent groove configuration, and
second lug grooves each extending along said mildly-inclined part, wherein
the first lug grooves each have its axially inner end at an axial distance La of from 8 to 12% of the tread width from the circumferential groove,
the steeply-inclined part extends axially outwardly from said axially inner end while inclining at an angle θ7 larger than an inclination angle θ4 of the oblique grooves,
the angle θ7 of the axially inner steeply-inclined part is in a range of from 20 to 30 degrees,
the axially outer mildly-inclined part is inclined at an angle θ8 in a range of from 40 to 60 degrees, and
between every two of the circumferentially adjacent oblique grooves, one first lug groove and one second lug groove are disposed.

2. The pneumatic tire according to claim 1, wherein
said one circumferential direction is opposite to an intended tire rotational direction indicated on the outer surface of the tire, and
the first lug groove has a heel-side groove-sidewall and a toe-side groove-sidewall in the intended tire rotational direction wherein the angle of the heel-side groove-sidewall with respect to the normal direction to the tread surface is larger in the axially inner steeply-inclined part than in the axially outer mildly-inclined part.

3. The pneumatic tire according to claim 2, wherein the width of each oblique groove at the axially inner end is not less than 8 mm.

4. The pneumatic tire according to claim 1, wherein the tread portion is further provided between each said second lug groove and the adjacent circumferential groove with an auxiliary groove which is disposed to extend along an extended line of the second lug groove.

5. The pneumatic tire according to claim 4, wherein the axial distance Lb between the auxiliary groove and the circumferential groove is not more than said distance La and not less than 4% of the tread width.

6. The pneumatic tire according to claim 4, wherein
said one circumferential direction is opposite to an intended tire rotational direction indicated on the outer surface of the tire, and
the oblique grooves, the lug grooves and the auxiliary grooves each have a heel-side groove-sidewall and a toe-side groove-sidewall in the intended tire rotational direction, wherein
a corner formed between the toe-side groove-sidewall and the tread surface is chamfered, but a corner formed between the heel-side groove-sidewall and the tread surface is not chamfered.

7. The pneumatic tire of claim 1 wherein one tread half portion of the tire tread is circumferentially shifted from the other tread half portion.

8. The pneumatic tire of claim 1, wherein a land portion disposed between the pair of straight circumferential grooves has an axial width We of from 10 to 15% of the tread width.

* * * * *